United States Patent
Sakamoto et al.

(10) Patent No.: US 9,649,890 B2
(45) Date of Patent: May 16, 2017

(54) METHOD FOR MANUFACTURING TIRE AND PNEUMATIC TIRE MANUFACTURED THEREBY

(71) Applicant: SUMITOMO RUBBER INDUSTRIES, LTD., Kobe-shi, Hyogo (JP)

(72) Inventors: Masayuki Sakamoto, Kobe (JP); Osamu Togawa, Kobe (JP); Hisanobu Uenosono, Kobe (JP); Hiroki Miura, Kobe (JP); Nobuaki Minami, Kobe (JP)

(73) Assignee: SUMITOMO RUBBER INDUSTRIES, LTD., Kobe-Shi (JP)

( * ) Notice: Subject to any disclaimer, the term of this patent is extended or adjusted under 35 U.S.C. 154(b) by 213 days.

(21) Appl. No.: 14/177,468

(22) Filed: Feb. 11, 2014

(65) Prior Publication Data
    US 2014/0261947 A1  Sep. 18, 2014

(30) Foreign Application Priority Data
    Mar. 12, 2013  (JP) ................. 2013-049485

(51) Int. Cl.
    *B29D 30/06*    (2006.01)
    *B60C 13/00*    (2006.01)
    *B29D 30/72*    (2006.01)

(52) U.S. Cl.
    CPC .... *B60C 13/001* (2013.04); *B29D 2030/0612* (2013.01); *B29D 2030/726* (2013.01)

(58) Field of Classification Search
    None
    See application file for complete search history.

(56) References Cited

U.S. PATENT DOCUMENTS

| 4,224,268 A * | 9/1980 | Merli ................. B29D 30/72 |
|---|---|---|
| | | 152/524 |
| 7,883,326 B1 * | 2/2011 | Parmelee ........... B29D 30/0606 |
| | | 249/103 |

FOREIGN PATENT DOCUMENTS

JP    4-126838 U    11/1992

* cited by examiner

*Primary Examiner* — Monica Huson
(74) *Attorney, Agent, or Firm* — Birch, Stewart, Kolasch & Birch, LLP

(57) ABSTRACT

A method for manufacturing a tire having a sidewall portion provided with a projecting marking is disclosed. A stencil plate for molding the projecting marking is made of a thin metallic plate whose thickness is 0.2 to 0.8 mm and mounted in a recess formed in a sidewall molding surface of the tire vulcanization mold. A concave marking part for molding the projecting marking is formed by press working upon the metallic plate. Edge portions of the stencil plate are turned back. The backward extension H2 of the turnback is substantially the same as the depth of the concave marking part.

9 Claims, 7 Drawing Sheets

METHOD FOR MANUFACTURING TIRE AND PNEUMATIC TIRE MANUFACTURED THEREBY

BACKGROUND OF THE INVENTION

The present invention relates to a method for manufacturing a tire whose sidewall portion is provided with a projecting marking and a pneumatic tire manufactured thereby, more particularly to a structure of a tire vulcanizing mold comprising a stencil plate for forming a projecting marking.

Usually, as shown in FIG. 6(A), a tire T is provided in the outer surface of its sidewall portion Ts with a marking (e) which may be a character, diagram, symbol or the like.

Such marking (e) is usually molded by the use of a stencil plate interchangeably attached to the sidewall molding surface of a tire vulcanization mold. (cf. Japanese Utility Model application publication No. JP-U-H04-126838) more specifically, as shown in FIG. 6(B), the stencil plate (c) is placed in a recess (b) formed in the sidewall molding surface (a1) of the vulcanization mold (a) and having a depth substantially equal to the thickness of the stencil plate (c). The surface of the stencil plate (c) is provided with a marking part (c1) corresponding to the reverse of the marking (e) and protruding from the surface.

Thus, the marking (e) as a dent in the outer surface of the sidewall portion Ts is formed by the marking part (c1) during vulcanization. Incidentally, in FIGS. 6(A) and 6(B), such marking (e) and marking part (c1) are illustrated as having a circular form for the sake of simplicity.

In the meantime, when it is required to form a marking (e) as a protrusion from the outer surface of the sidewall portion Ts of a tire, the marking part (c1) in the surface of the stencil plate (c) has to be formed as a dent, for example, by the technique of engraving.

In the technique of engraving, however, there is a problem with long production time and high production cost.

Therefore, the present inventors proposed to use a thin metal plate as the stencil plate, and to form a marking part as a dent by the technique of press working from the front surface side of the plate.

In this technique, the production time and production cost for forming the concave marking part is remarkably reduced, and a concave marking part having a depth more than the thickness of the stencil plate can be formed without difficulty.

When the technique of press working is employed on the thin stencil plate (c), as shown in FIG. 7(A), a swollen part (f) is formed on the reverse side of the stencil plate (c). As a result, when such stencil plate (c) is placed in the recess (b), the stencil plate (c) is liable to becomes unstable and dislocated during vulcanization as shown in FIG. 7(B). Therefore, a gap (g) is formed between the stencil plate (c) and the vulcanization mold (a), and the rubber which penetrates into such gap (g), causes fins on the surface of the vulcanized sidewall portion. Thus, there is another problem of defective moldings.

SUMMARY OF THE INVENTION

It is therefore, an object of the present invention to provide a method for manufacturing a tire and a pneumatic tire manufactured thereby, in which, although a concave marking part is formed by press working upon a thin stencil plate, the stencil plate can be stably mounted in a recess of a mold, therefore, it is possible to receive the benefit of the press working technique and achieve the prevention of defective moldings at the same time.

According to the present invention, a method for manufacturing a tire having a sidewall portion whose outer surface is provided with a projecting marking, comprises a step of vulcanization molding the raw tire by the use of a mold having a sidewall molding surface for molding the outer surface of the sidewall portion of the tire, wherein the mold comprises a stencil plate for molding the projecting marking, the stencil plate is mounted in a recess formed in the sidewall molding surface, the stencil plate is made of a metallic plate having a thickness of from 0.2 to 0.8 mm, the stencil plate has a circumferentially long shape in which the length in the tire circumferential direction is more than the width in the tire radial direction, the stencil plate is provided in the front surface thereof with a concave marking part for molding the projecting marking, formed by press working upon the metallic plate, both edge portions of the stencil plate in the widthwise direction of the stencil plate are formed as a turnback extending obliquely from the front surface toward the back side of the stencil plate, and the difference between the backward extension H2 of the turnback from the front surface and the depth H1 of the concave marking part from the front surface is not more than 0.3 mm.

Preferably, the depth H1 of the concave marking part is 0.3 to 1.3 mm. The front surface of the stencil plate may protrudes from the sidewall molding surface. Preferably, the amount of protruding H3 of the front surface of the stencil plate from the sidewall molding surface is less than the sum (H2+t0) of the backward extension H2 and the thickness t0 of the stencil plate. Preferably, the amount of protruding H3 of the front surface of the stencil plate from the sidewall molding surface is less than the depth H1 of the concave marking part.

Therefore, in comparison with the technique of engraving, the production time and cost for forming the concave marking part can be reduced. Further, it becomes possible to form the concave marking part having a depth more than the thickness of the stencil plate. Owing to the turnback, the stencil plate placed in the recess become stable, and its displacement and inclination during vulcanization are effectively reduced, therefore, the occurrence of fins on the molded face (molding defect) can be prevented.

DESCRIPTION OF THE PREFERRED EMBODIMENTS

Embodiments of the present invention will now be described in detail in conjunction with accompanying drawings.

According to the present invention, the method for manufacturing a tire 1 is not limited to only a pneumatic tire, and the pneumatic tire is not limited to a specific internal tire structure as far as the sidewall portion 3 of the tire 1 is provided with a projecting marking 9.
Thus, the present invention can be applied to a method for manufacturing a solid tire.

Figure 1:
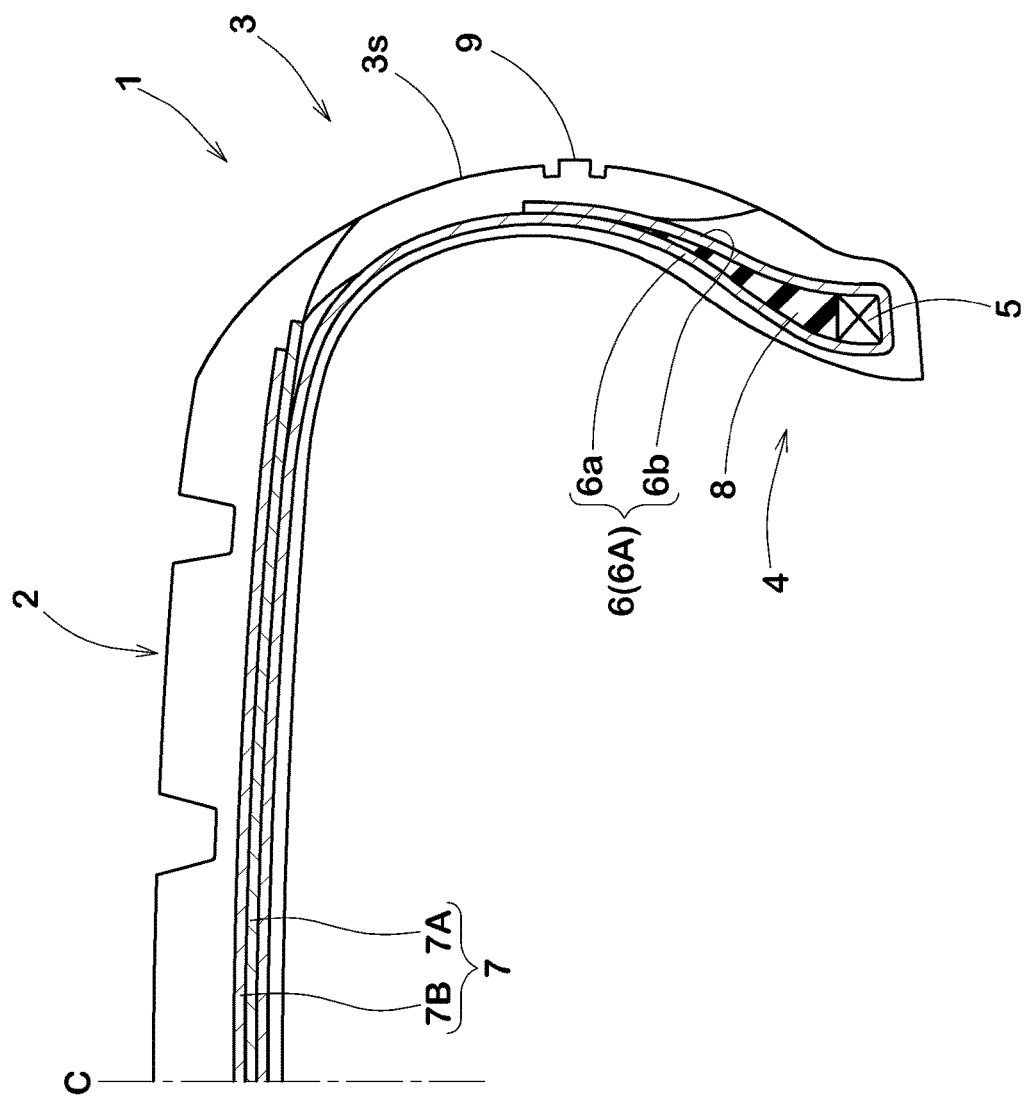
FIG. 1 is a cross sectional view of a pneumatic tire manufactured by a method according to the present invention.

FIG. 1 shows the cross section of a pneumatic tire as an example of the tire 1 manufactured by a method according to the present invention.

In this example, the tire 1 comprises a tread portion 2, a pair of axially spaced bead portions 4 each with a bead core 5 therein, a pair of sidewall portions 3 extending between the tread edges and the bead portions 5, a carcass extending between the bead portions 4, and a tread reinforcing belt 7 disposed radially outside the carcass in the tread portion 2.

The carcass 6 is composed of at least one ply 6A, in this example only one ply, of cords arranged radially at an angle of from 75 to 90 degrees with respect to the tire circumferential direction. The carcass ply 6A extends between the bead portions 4 through the tread portion 2 and sidewall portions 3 and turned up around the bead core 5 in each bead portion 4 from the axially inside to the axially outside of the tire to form a pair of turnup portions 6b and a main portion 6a therebetween. Between the main portion 6a and turned up portion 6b of the carcass ply 6A, there is disposed a bead apex 8 made of a hard rubber extending radially outwardly from the bead core 5 in a tapered manner in order to reinforce the bead portion 4.

The belt 7 comprises at least two cross plies 7A and 7B of cords laid at an angle of from 10 to 35 degrees with respect to the tire circumferential direction to reinforce the substantially entire width of the tread portion 2 by its hoop effect.

The outer surface 3s of the sidewall portion 3 is provided with projecting markings 9.

Each marking 9 is a character, a symbol, a diagram or the like, and the marking or markings 9 are used to indicate, for example, the tire size, manufacturer's serial number, date of manufacture, manufacture name, brand name and the like.

Figure 2:
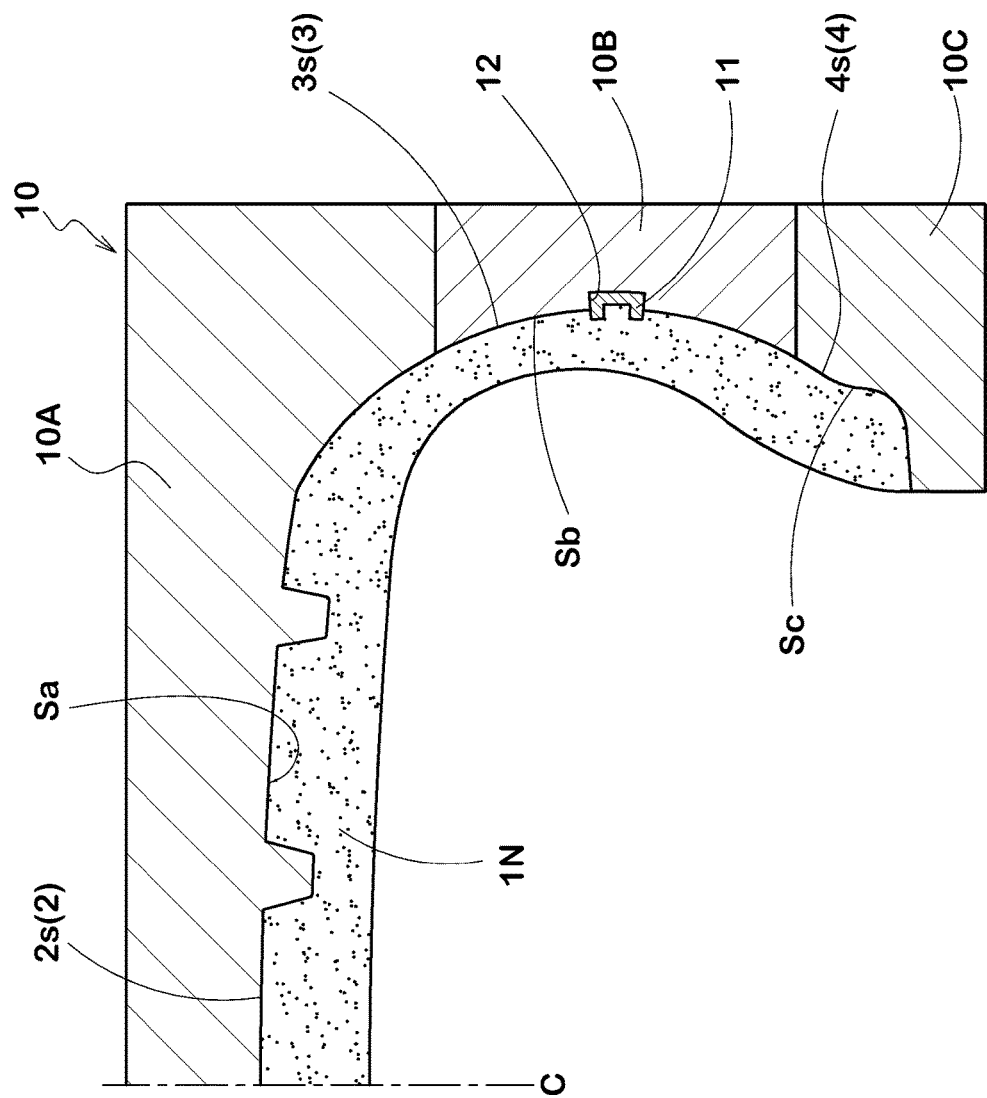
FIG. 2 is a schematic cross sectional view of a vulcanization mold used in the vulcanization step of the method.

The method for manufacturing the pneumatic tire 1 comprises a step of vulcanizing a raw tire 1N in a vulcanization mold 10 as shown conceptually in FIG. 2. As to other steps than the vulcanization step, conventionally employed steps may be incorporated.

The vulcanization mold 10 comprises: a tread mold segment 10A having a tread molding surface Sa for molding the tread face 2s or the outer surface 2s of the tread portion 2; a sidewall mold segment 10B having a sidewall molding surface Sb for molding the sidewall face 3s or the outer surface 3s the sidewall portions 3: and a bead mold segment 10c having a bead molding surface Sc for molding the bead face 4s or the outer surface 4s of the bead portions 4.

The sidewall mold segment 10B comprises a stencil plate 11 for forming the marking(s) 9, and
the sidewall molding surface Sb is provided with a recess 12 in which the stencil plate 11 is mounted.

Figure 3:
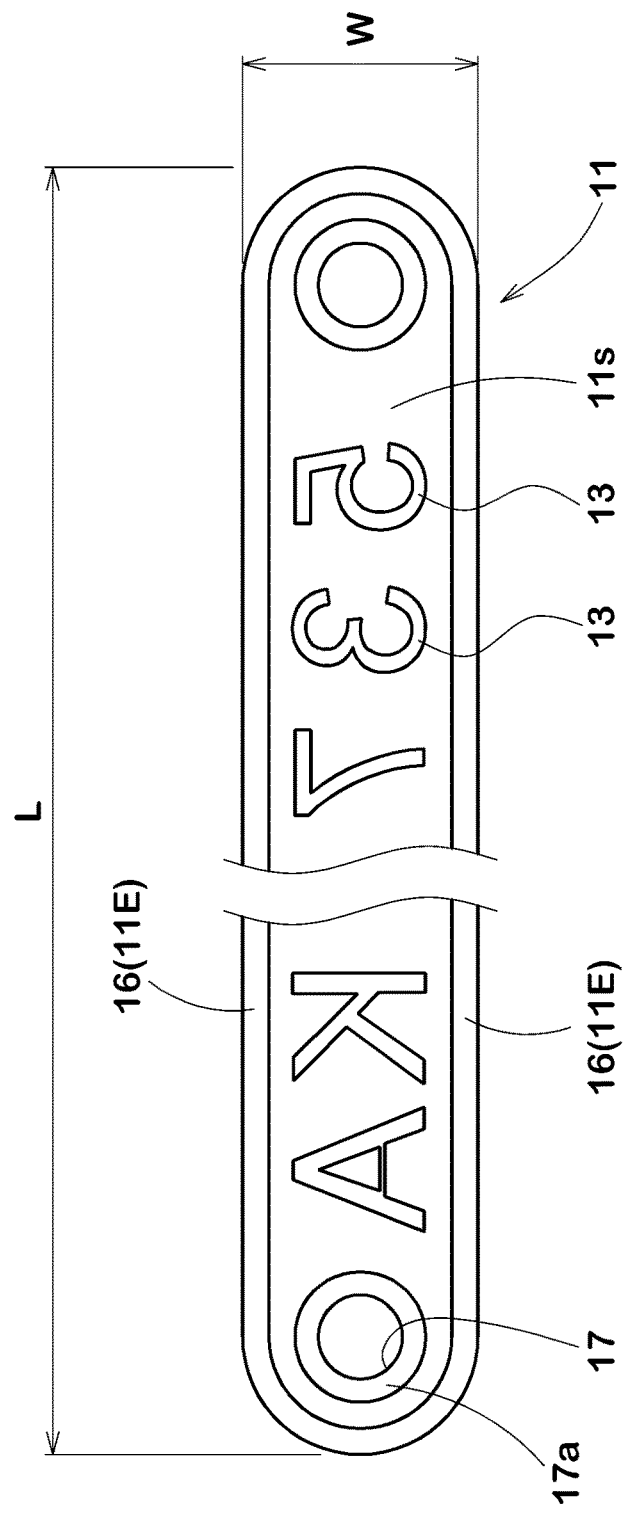
FIG. 3 is a front view of a stencil plate of the vulcanization mold.
Figure 4:
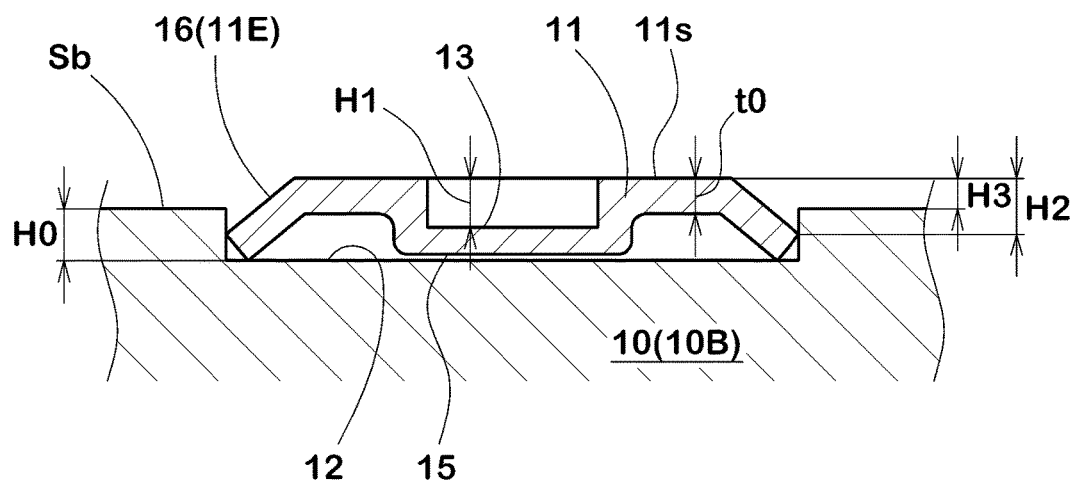
FIG. 4 is a cross sectional view of the stencil plate taken along the width direction of the stencil plate to show a state of the stencil plate mounted in a recess of the vulcanization mold.

As shown in FIGS. 3 and 4, the stencil plate 11 is made of a thin metal plate.

As to the metal material of the metal plate 11, for example, aluminum and steel may be suitably used.

If the thickness t0 of the metal plate is less than 0.2 mm, the stencil plate 11 is liable to deform during vulcanization. If the thickness t0 is more than 0.8 mm, the stencil plate 11 is liable to deform at the time of press working. Therefore, it is preferable that the thickness t0 of the metal plate is 0.2 to 0.8 mm.

The stencil plate 11 has a circumferentially long shape in which the length L in the tire circumferential direction is more than the width W in the tire radial direction.

The stencil plate 11 is provided in its front surface 11s facing to the tire, with
a concave marking part 13 for forming the solo marking 9 or
a plurality of concave marking parts 13 for forming the markings 9, respectively.

The concave marking part 13 is formed by press working upon the thin metal plate 11 from the front surface 11s side.

The shape of the concave marking part 13 is the reverse of the marking 9.

In this example, the depth H1 of the concave marking part 13 from the front surface 11s is set in a range of from 0.3 to 1.3 mm.

Since the press working is made upon the thin metal plate, the concave marking part 13 appears on the back side of the stencil plate 11 as a swollen part 15, the amount of protruding of which is substantially the same as the depth H1. Accordingly, if the stencil plate 11 is mounted as it is, it becomes unstable as explained above.

In the present invention, therefore, both edge portions 11E of the stencil plate 11 in its widthwise direction are formed as a turnback 16 extending obliquely from the front surface toward the back side of the stencil plate 11 and also toward the outside in the widthwise direction.

In this example, the turnback 16 is formed continuously along the entire perimeter of the stencil plate 11.

The backward extension H2 of the turnback 16 from the front surface 11s is set to be substantially the same as the depth H1 of the solo concave marking part 13 or the deepest one of the concave marking parts 13, namely, the difference |H2−H1| therebetween is not more than 0.3 mm
in order that the rear edge of the turnback 16 and the rear surface of the swollen part 15 become the same depth from the front surface 11s, in other words, become positioned substantially in a plane so as to touch the bottom of the recess 12 of the vulcanization mold 10. Thereby, the stencil plate 11 can be stably mounted in the recess 12.

In this example, the stencil plate 11 is fixed to the bottom of the recess 12 by the use of screws for example countersunk screws.

For that purpose, as shown in FIG. 3, the stencil plate 11 is provided with through-holes 17 for the screws, and around the through-hole 17, there is formed a conical counterbore 17a into which the head of the countersunk screw fits.

In addition to the screws, an adhesive agent, a technique of press fitting into the recess 12 and the like may be employed alone or in combination as the means to fix the plate 11 to the mold 10.

It is preferable that the front surface 11s of the stencil plate 11 slightly protrudes from the sidewall molding surface Sb.

In such a case, the amount of protruding H3 of the front surface 11s from the sidewall molding surface Sb is preferably less than the sum (H2+t0) of the backward extension H2 and the thickness t0 of the stencil plate.

More preferably, the amount of protruding H3 is less than the backward extension H2 in order that the edge portions 11E of the stencil plate 11 are completely sunk into the recess 12.

Thereby, the mounting is further assured, and further, the occurrence of fins can be prevented.

It is preferable that the depth H0 of the plate mounting recess 12 is not less than the thickness t0 of the stencil plate 11 and not more than the backward extension H2.

Figure 5:
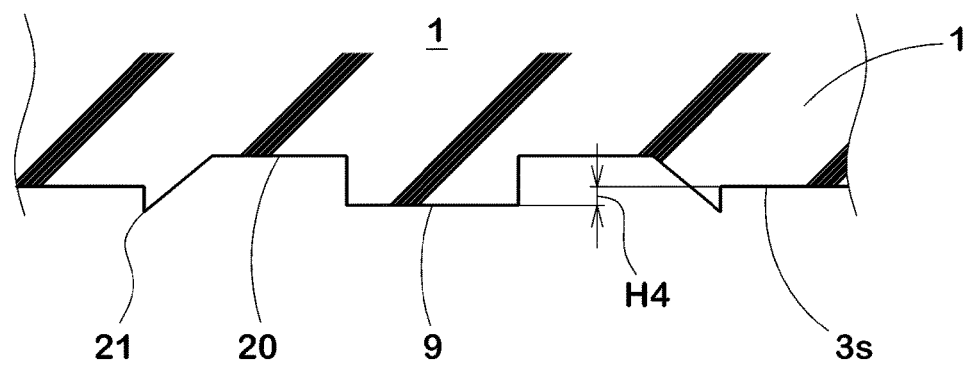
FIG. 5 is an enlarged cross sectional view of a part of the sidewall portion of the vulcanized tire in which a projecting marking is formed by the stencil plate shown in FIG. 4.
Figure 6A:
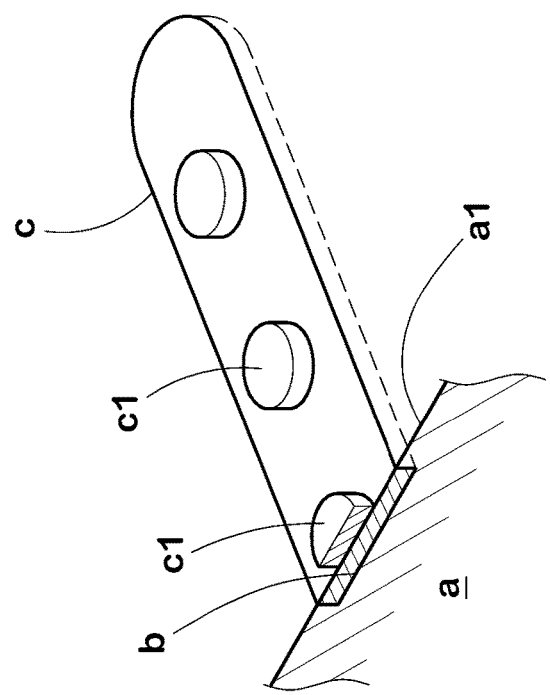
FIG. 6(A) is a diagramatic side view of a tire.
Figure 6B:
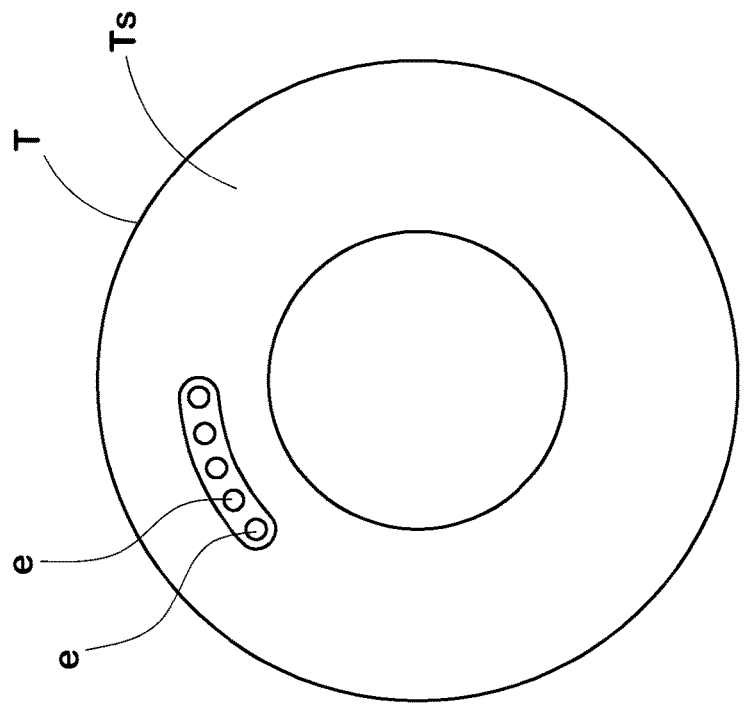
FIG. 6(B) is a diagramatic perspective view partly in section of a stencil plate attached to a vulcanization mold, for explaining a conventional method for molding a concave marking.
Figure 7A:
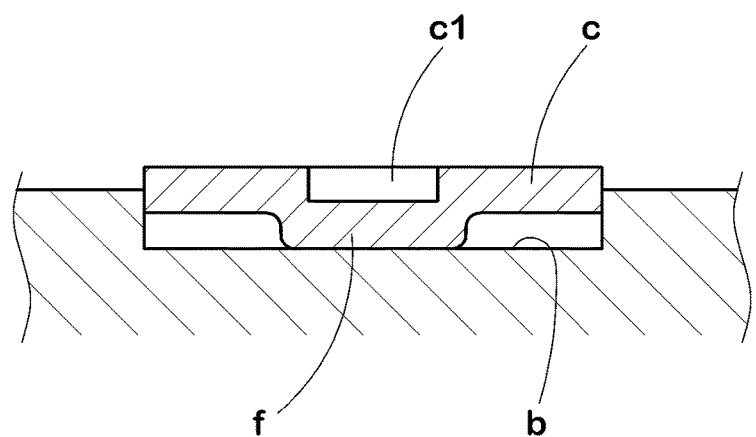
FIG. 7(A) and FIG. 7(B) are diagramatic cross sectional views of a stencil plate for explaining its problem when a concave marking part is formed by press working.
Figure 7B:
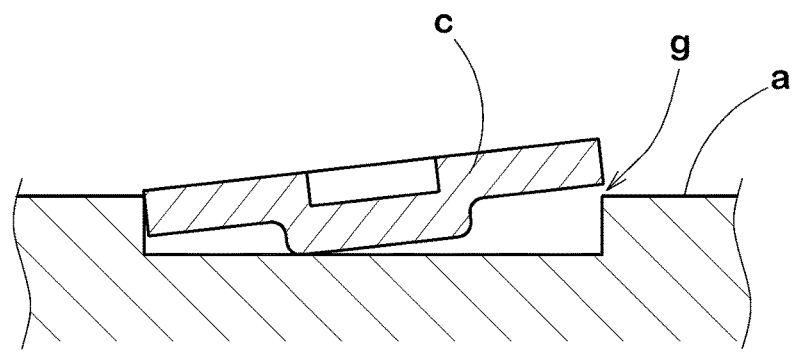

In the molded tire, as shown in FIG. 5, when the front surface 11s of the stencil plate 11 protrudes from the sidewall molding surface Sb, a depressed portion 20 is formed in the sidewall face 3s of the tire, and, from the bottom of the depressed portion 20, the marking 9 protrudes. Therefore, the visibility of the marking 9 can be improved while reducing the amount of protruding H4 of the marking 9 from the sidewall face 3s. As a result, the occurrence of defective markings 9 due to insufficient rubber flow during vulcanization can be prevented.

When the amount of protruding H3 of the front surface 11s is less than the backward extension H2 of the turnback 16, the sidewall face 3s of the tire is provided around the depressed portion 20 with a rib 21 which protrudes from the sidewall face 3s by a small amount of protruding. Thereby, the appearance may be improved.

When the amount of protruding H3 is less than the depth H1 of the concave marking part 13, as the marking 9 protrudes from the sidewall face 3s, the visibility may be improved.

If the depth H1 of the concave marking part 13 becomes less than 0.3 mm, the visibility is decreased. If the depth H1 becomes more than 1.3 mm, the deformation of the stencil plate 11 due to the press working is liable to increase. Further, there is a possibility that the flow of rubber into such deep concave marking part 13 becomes insufficient, and defective marking 9 becomes liable to occur.

It is preferable that the size of the concave marking part 13 in the length direction of the stencil plate and the size of the concave marking part 13 in the width direction of the stencil plate are not more than 10 mm. If the sizes are large, the stencil plate 11 becomes liable to deform during vulcanization.

It is also preferable that the length L of the stencil plate 11 in the tire circumferential direction is not more than 100 mm, and the width W of the stencil plate 11 in the tire radial direction is not more than 20 mm. If the length and/or width are large, the thin stencil plate 11 becomes liable to deform during vulcanization.

Comparison Tests

In order to confirm the advantageous effects of the present invention, pneumatic tires (LT245/70R15) having projecting markings were manufactured, using stencil plates having cross-sectional shapes as shown in FIG. 4 and specifications shown in Table 1.

Specifications other than shown in Table 1 were substantially identical.

The concave marking parts of each stencil plate were formed by press working, therefore, the concave marking parts appeared on the back side of the stencil plate as swollen parts having the amount of protruding substantially the same as the depth H1.

(1) Molding Test:

The markings and region therearound were visually checked for fins and molding defect.

Here, the "fin" is a membranous vulcanized rubber formed as a result of the rubber penetrating into the gap formed between the dislocated or inclined stencil plate and the recess of the sidewall molding surface.

The "molding defect" is a lack of rubber caused on the vulcanized surface as a result of an insufficient rubber flow or shortage of the filled rubber during vulcanization.

The number of the tires checked was 10,000 for each stencil plate. The rate of occurrence of the fins and that of the molding defect are shown in Table 1.

(2) Visibility Test:

The visibility of the markings were evaluated into five ranks. The results are shown in Table 1. The higher the rank number, the better the visibility.

(3) Appearance Test:

The markings, especially the region therearound were visually checked for defectiveness due to deformation (undulation) of the stencil plate, and the appearance was evaluated into three ranks. The results are shown in Table 1. The higher the rank number, the better the appearance.

TABLE 1

|  | Ref. 1 | Ex. 1 | Ex. 2 | Ex. 3 | Ref. 2 | Ref. 3 | Ex. 4 | Ex. 5 | Ex. 6 | Ex. 7 |
| --- | --- | --- | --- | --- | --- | --- | --- | --- | --- | --- |
| Recess |  |  |  |  |  |  |  |  |  |  |
| depth H0 (mm) | 1.2 | 0.5 | 0.5 | 0.5 | 0.5 | 0.5 | 0.5 | 0.5 | 0.5 | 0.5 |
| Stencil plate |  |  |  |  |  |  |  |  |  |  |
| thickness t0 (mm) | 0.3 | 0.3 | 0.3 | 0.3 | 0.3 | 0.3 | 0.3 | 0.3 | 0.3 | 0.3 |
| length L (mm) | 65 | 65 | 65 | 65 | 65 | 65 | 65 | 65 | 65 | 65 |
| width W (mm) | 12 | 12 | 12 | 12 | 12 | 12 | 12 | 12 | 12 | 12 |
| protruding H3 (mm) | 0.4 | 0.8 | 0.5 | 0.5 | 0.9 | 0.5 | 0 | 0.1 | 1.1 | 1.2 |
| Concave marking part |  |  |  |  |  |  |  |  |  |  |
| depth H1 (mm) | 1.3 | 0.7 | 0.7 | 0.7 | 0.7 | 0.7 | 0.2 | 0.3 | 1.3 | 1.4 |
| size(radial) (mm) | 7.0 | 7.0 | 7.0 | 7.0 | 7.0 | 7.0 | 7.0 | 7.0 | 7.0 | 7.0 |
| size(circum.) (mm) | 3.5 | 3.5 | 3.5 | 3.5 | 3.5 | 3.5 | 3.5 | 3.5 | 3.5 | 3.5 |
| Turnback | non |  |  |  |  |  |  |  |  |  |
| extension H2 (mm) | 0 | 1 | 0.7 | 0.4 | 1.1 | 0.3 | 0.2 | 0.3 | 1.3 | 1.4 |
| H1 − H2 (mm) | 1.3 | −0.3 | 0 | 0.3 | −0.4 | 0.4 | 0 | 0 | 0 | 0 |
| Fins (%) | 0.05 | 0 | 0 | 0 | 0.03 | 0.02 | 0 | 0 | 0 | 0 |

TABLE 1-continued

| | | | | | | | | | |
|---|---|---|---|---|---|---|---|---|---|
| Molding defect (%) | 0 | 0 | 0 | 0 | 0 | 0 | 0 | 0 | 0 | 0.05 |
| Visibility | 5 | 4 | 4 | 4 | 4 | 4 | 2 | 3 | 5 | 5 |
| Appearance | 1 | 1 | 1 | 1 | 3 | 2 | 1 | 1 | 1 | 2 |

| | Ref. 2 | Ex. 8 | Ex. 9 | Ref. 3 | Ex. 10 | Ex. 11 | Ex. 12 | Ex. 13 |
|---|---|---|---|---|---|---|---|---|
| Recess | | | | | | | | |
| depth H0 (mm) | 0.5 | 0.5 | 0.5 | 0.5 | 0.5 | 0.5 | 0.5 | 0.5 |
| Stencil plate | | | | | | | | |
| thickness t0 (mm) | 0.1 | 0.2 | 0.5 | 0.7 | 0.3 | 0.3 | 0.3 | 0.3 |
| length L (mm) | 65 | 65 | 65 | 65 | 65 | 65 | 100 | 120 |
| width W (mm) | 12 | 12 | 12 | 12 | 20 | 25 | 12 | 12 |
| protruding H3 (mm) | 0.3 | 0.4 | 0.7 | 0.9 | 0.5 | 0.5 | 0.5 | 0.5 |
| Concave marking part | | | | | | | | |
| depth H1 (mm) | 0.7 | 0.7 | 0.7 | 0.7 | 0.7 | 0.7 | 0.7 | 0.7 |
| size(radial) (mm) | 7.0 | 7.0 | 7.0 | 7.0 | 10 | 10 | 7.0 | 7.0 |
| size(circum.) (mm) | 3.5 | 3.5 | 3.5 | 3.5 | 5.5 | 5.5 | 3.5 | 3.5 |
| Turnback | | | | | | | | |
| extension H2 (mm) | 0.7 | 0.7 | 0.7 | 0.7 | 0.7 | 0.7 | 0.7 | 0.7 |
| H1 − H2 (mm) | 0 | 0 | 0 | 0 | 0 | 0 | 0 | 0 |
| Fins (%) | 0 | 0 | 0 | 0 | 0 | 0 | 0 | 0 |
| Molding defect (%) | 0.01 | 0.01 | 0 | 0 | 0 | 0 | 0 | 0 |
| Visibility | 5 | 4 | 4 | 4 | 4 | 4 | 4 | 4 |
| Appearance | 3 | 1 | 1 | 3 | 1 | 2 | 1 | 2 |

In the embodiments Ex.1-Ex.13, the mounting of the stencil plate became stable, and the occurrence of fins was prevented as shown in Table 1.

In the embodiment Ex.4, since the depth H1 was very small, the visibility was decreased.

In the embodiment Ex.7, since the depth H1 was very large, the rubber flow into the concave marking part became insufficient, and molding defect was caused on the markings. Further, the stencil plate was deformed by the press working, and negatively affected the appearance.

In the embodiments Ex.11 and Ex.13, since the width and length of the stencil plate were large, the stiffness of the stencil plate was decreased, and the stencil plate became liable to deform during vulcanization. As a result, the stencil plate negatively affected the appearance.

In the reference example Ref. 2, since the thickness of the stencil plate was too small, the stencil plate was deformed during vulcanization, and the appearance was deteriorated.

In the reference example Ref. 3, since the thickness of the stencil plate was more than the depth H0 of the recess, the appearance was deteriorated.

When t0=<H0, there was no problem even if the thickness t0 was increased up to 0.8 mm. But if the thickness t0 exceeded 0.8 mm, the stencil plate was deformed by the press working and negatively affected the appearance.

The invention claimed is:

1. A method for manufacturing a tire having a sidewall portion whose outer surface is provided with a projecting marking, comprising
    vulcanization molding the raw tire by the use of a mold having a sidewall molding surface for molding the outer surface of the sidewall portion of the tire,
wherein the mold comprises a stencil plate for molding the projecting marking,
    mounting the stencil plate in a recess formed in the sidewall molding surface,
    wherein the stencil plate is made of a metallic plate having a thickness t0 of from 0.2 to 0.8 mm,
    providing the stencil plate in the front surface thereof with a concave marking part for molding the projecting marking, formed by press working upon the metallic plate whereby a swollen part corresponding to the concave marking part is formed on the back side of the stencil plate,
    forming an entire peripheral edge portion of the stencil plate as a turnback, the turnback extending obliquely from the front surface toward the outside of the stencil plate and toward the back side of the stencil plate so that the rear edge of the turnback and the rear surface of the swollen part are positioned substantially in a same plane, and
    the difference between the backward extension H2 of the turnback from the front surface and the depth H1 of the concave marking part from the front surface is not more than 0.3 mm,
    contacting a rear edge of the turnback with a side wall of the recess, the side wall extending from the sidewall molding surface toward the bottom of the recess, and
    forming a continuous groove between the rear edge and the side wall at a certain depth from the sidewall molding surface toward the bottom of the recess around the stencil plate by the side wall of the recess and the turnback.

2. The method according to claim 1, wherein the depth H1 of the concave marking part is 0.3 to 1.3 mm.

3. The method according to claim 1, wherein the front surface of the stencil plate protrudes from the sidewall molding surface.

4. The method according to claim 3, wherein the amount of protruding H3 of the front surface of the stencil plate from the sidewall molding surface is less than the sum (H2+t0) of the backward extension H2 and the thickness t0 of the stencil plate.

5. The method according to claim 3, wherein the amount of protruding H3 of the front surface of the stencil plate from the sidewall molding surface is less than the depth H1 of the concave marking part.

6. The method according to claim 2, wherein the front surface of the stencil plate protrudes from the sidewall molding surface.

7. The method according to claim 4, wherein the amount of protruding H3 of the front surface of the stencil plate from the sidewall molding surface is less than the depth H1 of the concave marking part.

8. The method according to claim 1, wherein the stencil plate is provided with a through-hole for a screw, and
   wherein the stencil plate is fixed to the bottom of said recess by the use of the screw.

9. The method according to claim 1, wherein the stencil plate is provided with a through-hole for a screw, and
   wherein the stencil plate is fixed to the bottom of said recess by the use of the screw.

\* \* \* \* \*